United States Patent
Lubbers et al.

(10) Patent No.: US 8,745,326 B2
(45) Date of Patent: Jun. 3, 2014

(54) REQUEST PRIORITY SEEK MANAGER

(75) Inventors: Clark Edward Lubbers, Colorado Springs, CO (US); Robert Michael Lester, Colorado Springs, CO (US)

(73) Assignee: Seagate Technology LLC, Cupertino, CA (US)

(*) Notice: Subject to any disclaimer, the term of this patent is extended or adjusted under 35 U.S.C. 154(b) by 1819 days.

(21) Appl. No.: 11/771,505

(22) Filed: Jun. 29, 2007

(65) Prior Publication Data

US 2009/0006739 A1  Jan. 1, 2009

Related U.S. Application Data

(63) Continuation-in-part of application No. 11/144,468, filed on Jun. 2, 2005, now Pat. No. 7,260,681.

(51) Int. Cl.
*G06F 12/00* (2006.01)
*G06F 3/06* (2006.01)

(52) U.S. Cl.
USPC ............... 711/114; 711/154; 711/E12.001; 714/6.22; 714/E11.092

(58) Field of Classification Search
None
See application file for complete search history.

(56) References Cited

U.S. PATENT DOCUMENTS

| 6,009,275 A | 12/1999 | DeKoning |
| 6,675,258 B1* | 1/2004 | Bramhall et al. ............ 711/114 |
| 2002/0129320 A1* | 9/2002 | Bickerstaff et al. ........... 714/796 |
| 2003/0069972 A1* | 4/2003 | Yoshimura et al. ........... 709/226 |
| 2003/0071816 A1* | 4/2003 | Langendorf ................... 345/519 |
| 2003/0208523 A1* | 11/2003 | Gopalan et al. ............... 709/201 |

* cited by examiner

*Primary Examiner* — Matthew Bradley
*Assistant Examiner* — Daniel Bernard
(74) *Attorney, Agent, or Firm* — Hall Estill Attorneys at Law

(57) ABSTRACT

As apparatus and associated method for a dual active-active array storage system with a first controller with top level control of a first memory space and a second controller with top level control of a second memory space different than the first memory space. A seek manager residing in only one of the controllers defines individual command profiles derived from a combined list of data transfer requests from both controllers. A policy engine continuously collects qualitative information about a network load to both controllers to dynamically characterize the load, and governs the seek manager to continuously correlate each command profile in relation to the load characterization.

18 Claims, 7 Drawing Sheets

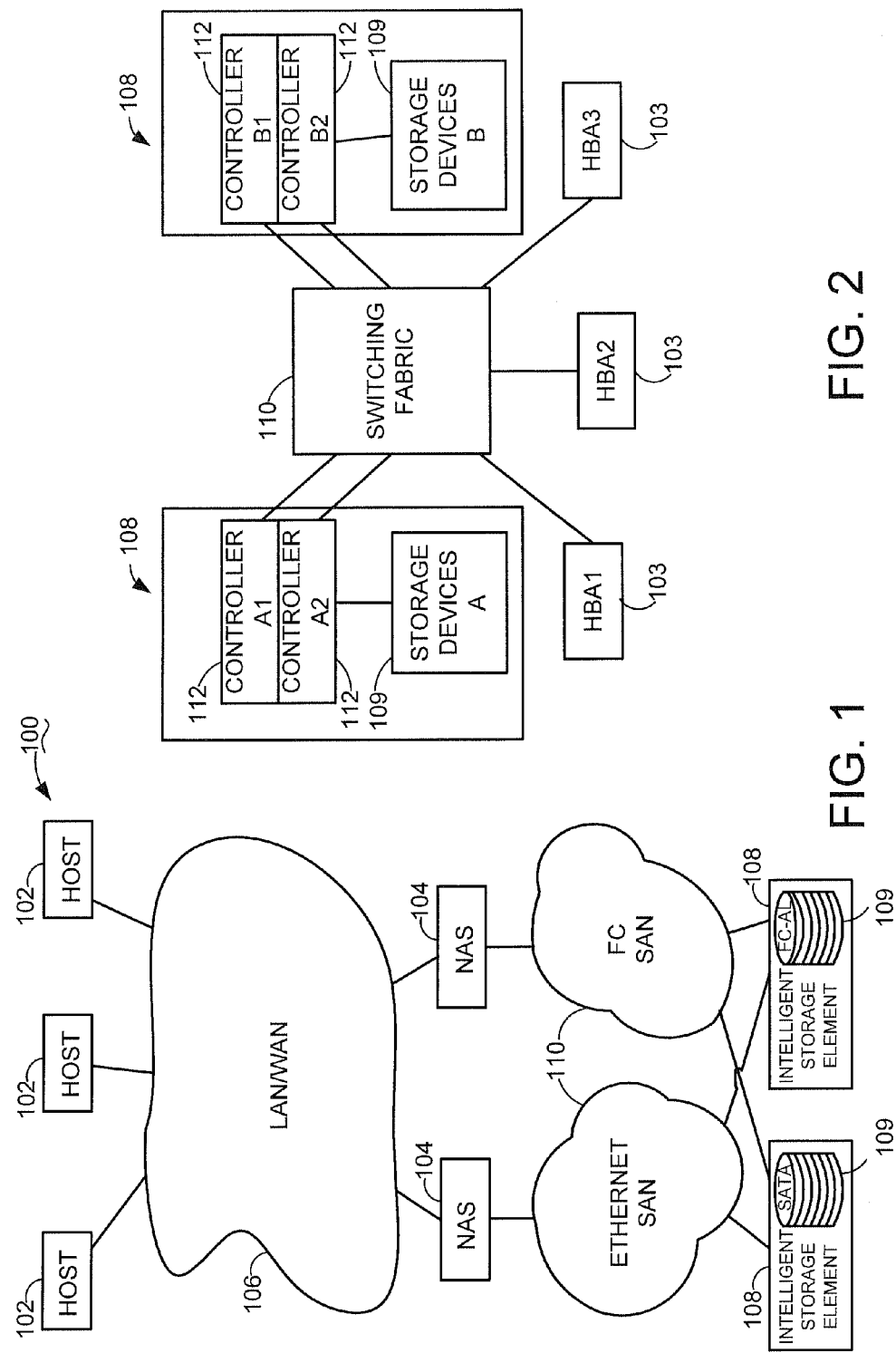

REQUEST PRIORITY SEEK MANAGER

CROSS REFERENCE TO RELATED APPLICATIONS

This application is a continuation-in-part of copending application Ser. No. 11/144,468 filed on Jun. 2, 2005.

FIELD OF THE INVENTION

Embodiments of the present invention relate generally to the field of data storage systems and more particularly, but not by way of limitation, to an apparatus and method for adaptively managing seek profiles in a distributed array storage system.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, it does not resolve the inherent difficulties associated with the general lack of flexibility in altering the presentation of virtual storage to the hosts. For example, the manner of storing data may need to be adapted to accommodate bursts of unusual host load activity. What is needed is an intelligent data storage subsystem that self-deterministically allocates, manages, and protects its respective data storage capacity and presents that capacity as a virtual storage space to the network to accommodate global storage requirements. This virtual storage space is able to be provisioned into multiple storage volumes. It is to this solution that embodiments of the present invention are directed.

SUMMARY OF THE INVENTION

Embodiments of the present invention are generally directed to deriving seek profiles in dual active-active array storage systems.

In some embodiments a dual active-active array storage system is provided with a first controller with top level control of a first memory space and a second controller with top level control of a second memory space different than the first memory space. A seek manager residing in only one of the controllers defines individual command profiles derived from a combined list of data transfer requests from both controllers. A policy engine continuously collects qualitative information about a network load to both controllers to dynamically characterize the load, and governs the seek manager to continuously correlate each command profile in relation to the load characterization.

In some embodiments a method is provided including receiving network access commands by a dual active-active array storage system to a first controller having top level control of a first memory space and to a second controller having top level control of a second memory space; collecting qualitative information about the access commands; dynamically characterizing the access command load to the controllers; sending data transfer requests associated with the access commands from both controllers independently of the other controller to a combined list; and issuing command profiles to each controller from the combined list with only one seek manager that is responsive to the dynamically characterizing step.

In some embodiments a storage system is provided with a dual active-active storage array configured for connecting to a network to transfer data in response to network access commands, and means for deriving individual command profiles to each storage device in the array that are dynamically correlated to an observed network load to the array.

These and various other features and advantages which characterize the claimed invention will become apparent upon reading the following detailed description and upon reviewing the associated drawings.

BRIEF DESCRIPTION OF THE DRAWINGS

FIG. 1 is a diagrammatic representation of a computer system constructed in accordance with embodiments of the present invention.

FIG. 2 is a simplified diagrammatic representation of a portion of the computer system of FIG. 1.

DETAILED DESCRIPTION

Figure 3:
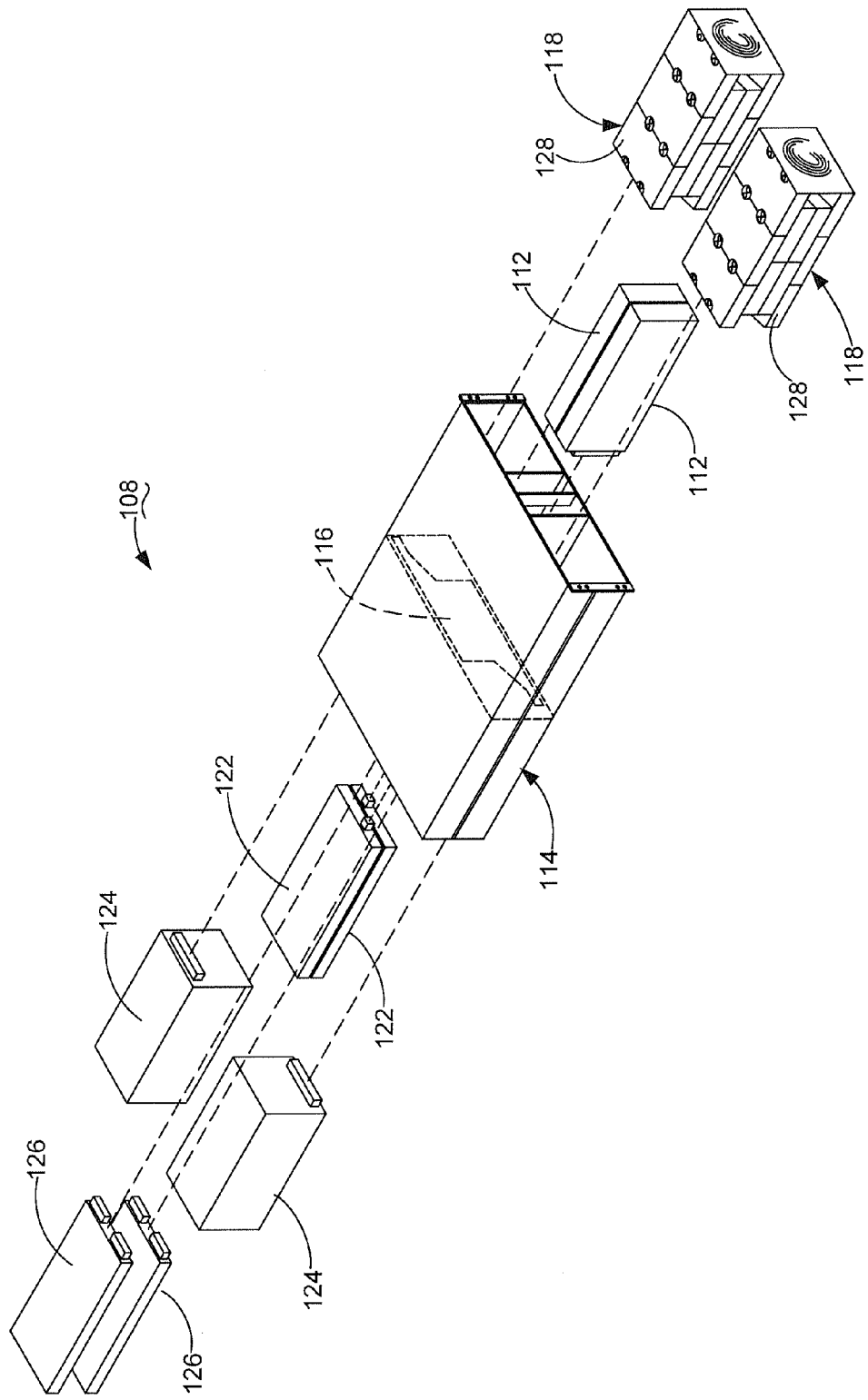
FIG. 3 is an exploded isometric view of an intelligent storage element constructed in accordance with embodiments of the present invention.

FIG. 1 is an illustrative computer system 100 in which embodiments of the present invention are useful. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent storage elements (ISE) 108. Accordingly, SANs 110 connect the servers 104 to the ISEs 108 for access to the stored data. The ISEs 108 provide a data storage capacity 109 for storing the data over various selected communication protocols such as serial ATA and fibre-channel, with enterprise or desktop class storage medium within.

FIG. 2 is a simplified diagrammatic view of part of the computer system 100 of FIG. 1. Three host bus adapters (HBA) 103 are depicted interacting with a pair of the ISEs 108 (denoted A and B, respectively) via the network or fabric 110. Each ISE 108 includes dual redundant controllers 112 (denoted A1, A2 and B1, B2) preferably operating on the data storage capacity 109 as a set of data storage devices characterized as a redundant array of independent drives (RAID). That is, the controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

FIG. 3 illustrates an ISE 108 constructed in accordance with illustrative embodiments of the present invention. A shelf 114 defines cavities for receivingly engaging the controllers 112 in electrical connection with a midplane 116. The shelf 114 is supported, in turn, within a cabinet (not shown). A pair of multiple drive assemblies (MDAs) 118 are receivingly engageable in the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

Figure 4:
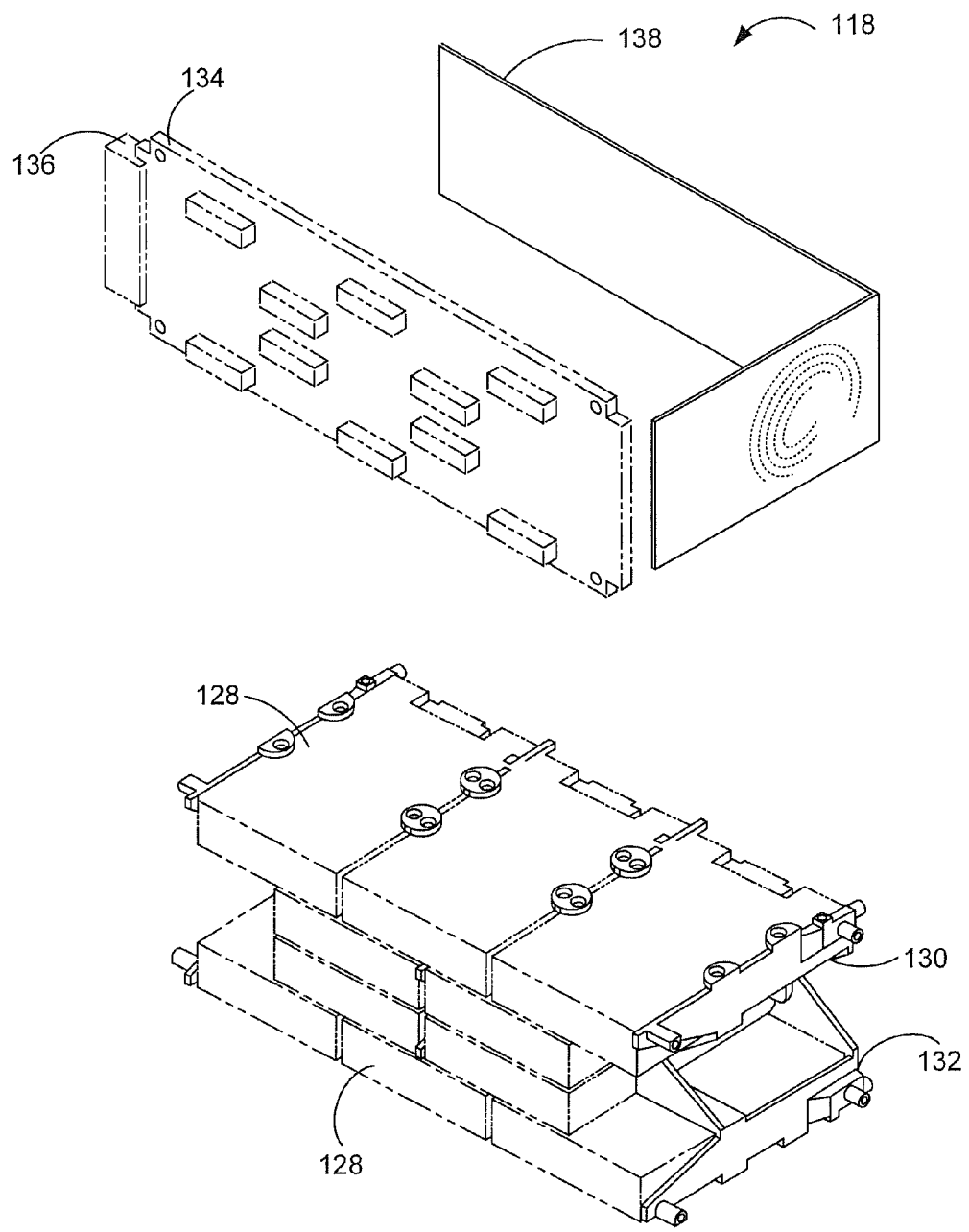
FIG. 4 is an exploded isometric view of a multiple drive array of the intelligent storage element of FIG. 3.

FIG. 4 is an enlarged exploded isometric view of the MDA 118 which has an upper partition 130 and a lower partition 132, each supporting five data storage devices 128. The partitions 130, 132 align the data storage devices 128 for connection with a common circuit board 134 having a connector 136 that operably engages the midplane 116 (FIG. 3). A wrapper 138 provides electromagnetic interference shielding. This illustrative embodiment of the MDA 118 is the subject matter of U.S. Pat. No. 7,133,291 entitled Carrier Device and Method for a Multiple Disc Array which is assigned to the assignee of the present invention and incorporated herein by reference. Another illustrative embodiment of the MDA 118 is the subject matter of U.S. Pat. No. 7,177,145 of the same title which is also assigned to the assignee of the present invention and incorporated herein by reference. In alternative equivalent embodiments the MDA 118 can be provided within a sealed enclosure.

Figure 5:
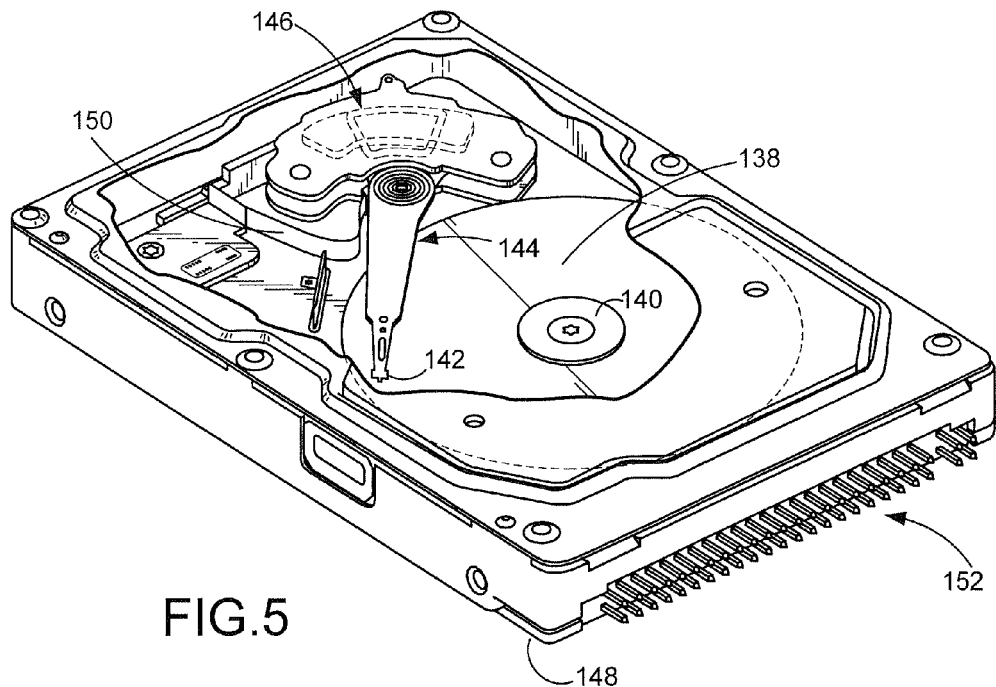
FIG. 5 is an exemplary data storage device used in the multiple drive array of FIG. 4.

FIG. 5 is an isometric view of the data storage device 128 suited for use with embodiments of the present invention and in the form of a rotating media disc drive. Although a rotating spindle with moving data storage medium is used for discussion purposes below, in alternative equivalent embodiments a non-rotating medium device, such as a solid state memory device is used. In the illustrative embodiments of FIG. 5 a data storage disc 138 is rotated by a motor 140 to present data storage locations of the disc 138 to a read/write head ("head") 142. The head 142 is supported at the distal end of a rotary actuator 144 that is responsive to a voice coil motor (VCM) 146 in moving the head 142 radially between inner and outer tracks of the disc 138. The head 142 is electrically connected to a circuit board 148 by way of a flex circuit 150. The circuit board 148 is adapted to receive and send control signals controlling the functions of the data storage device 128. A connector 152 is electrically connected to the circuit board 148, and is adapted for connecting the data storage device 128 with the circuit board 134 (FIG. 4) of the MDA 118.

Figure 6:
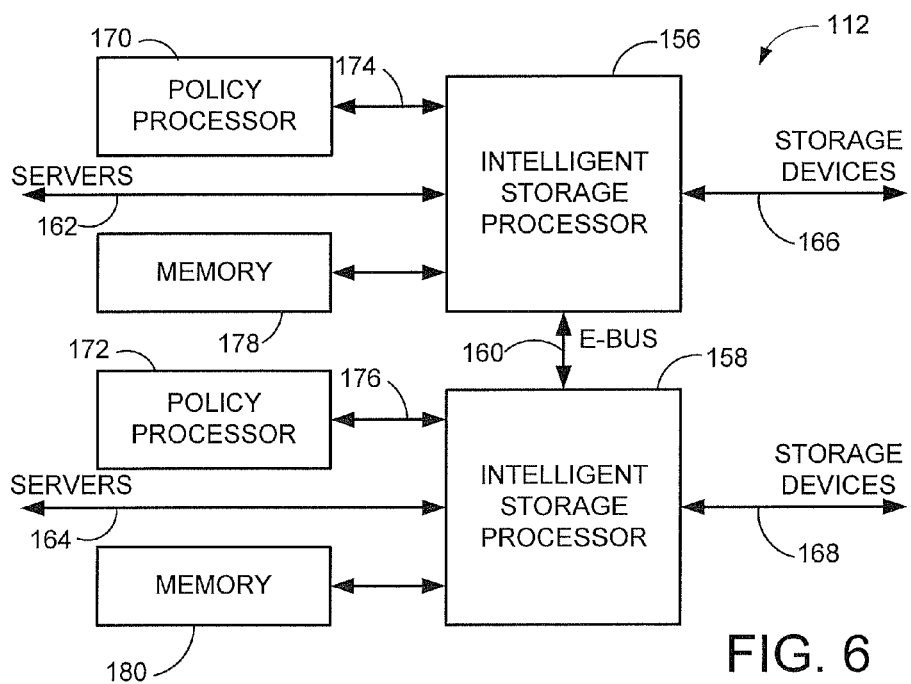
FIG. 6 is a functional block diagram of the array controller in the intelligent storage element.

FIG. 6 depicts the controller 112 architecture as having two intelligent storage processors (ISPs) 156, 158 coupled by an intermediate bus 160 (referred to as an "ebus"). Each of the ISPs 156, 158 is preferably disposed in a separate integrated circuit package on a common controller board. Preferably, the ISPs 156, 158 each respectively communicate with upstream application servers via fibre channel server links 162, 164, and with storage devices making up the storage capacity 109 via fibre channel storage links 166, 168.

Policy processors 170, 172 execute a real-time operating system for the controller 112 and communicate with the respective ISPs 156, 158 via PCI busses 174, 176. The policy processors 170, 172 can further execute customized logic to perform sophisticated processing tasks in conjunction with the ISPs 156, 158 for a given storage application. The ISPs 156, 158 and the policy processors 170, 172 access memory modules 178, 180 as required during operation.

Figure 7:
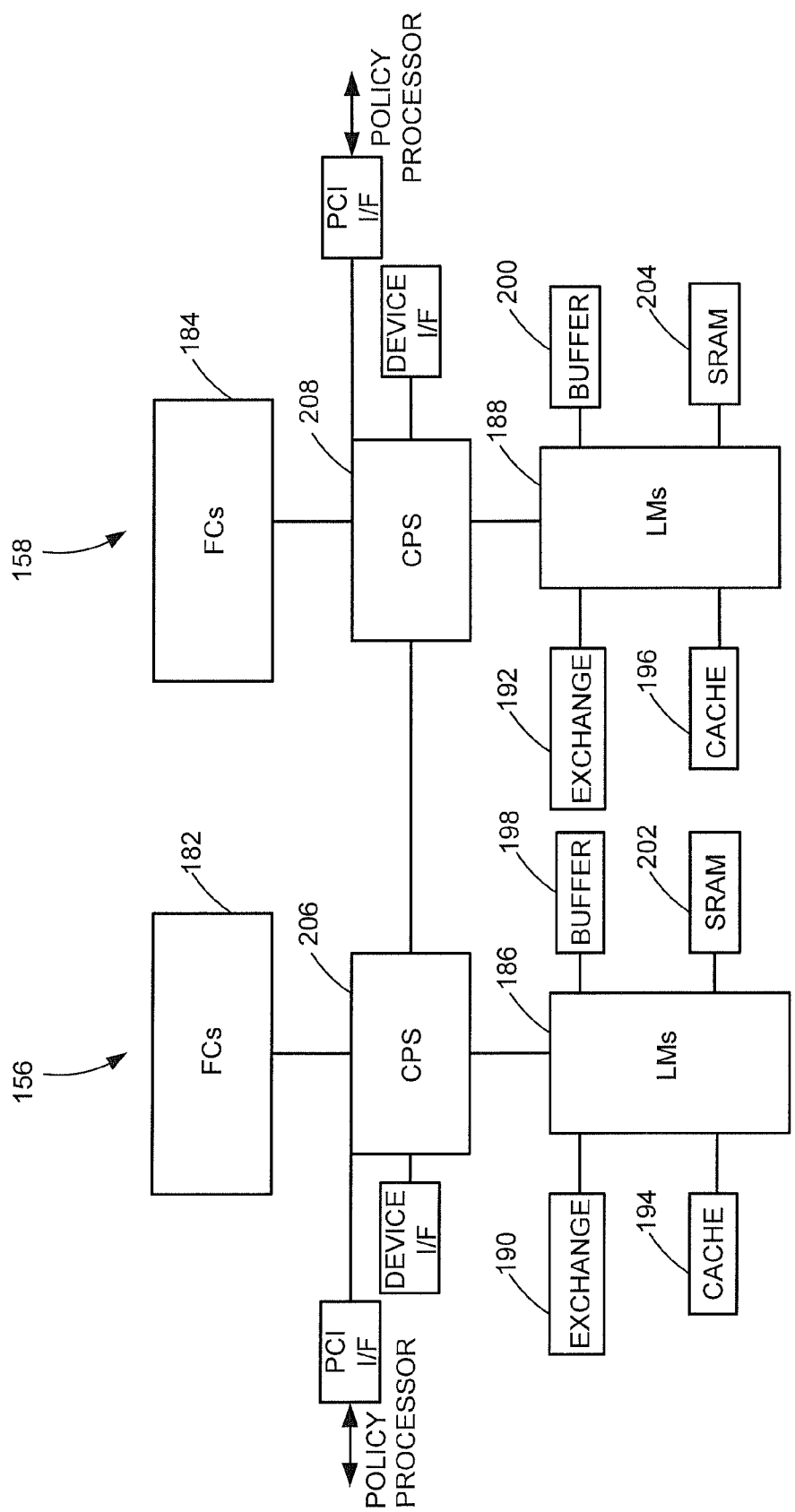
FIG. 7 is a functional block diagram of the intelligent storage processors of the array controller of FIG. 6.

FIG. 7 depicts a preferred construction for the paired ISPs 156, 158 of FIG. 6. A number of function controllers (FCs), collectively identified at 182, 184 perform a number of controller operations such as host exchange, direct memory access (DMA), exclusive-or (XOR), command routing, metadata control, and disc exchange. Each FC preferably contains a highly flexible feature set and interface to facilitate memory exchanges and other scheduling tasks.

A number of list managers (LMs), denoted generally at 186, 188 are used for various data and memory management tasks during controller operation, such as cache table management, metadata maintenance, and buffer management. The LMs 186, 188 preferably perform well-defined operations on memory to accomplish tasks as directed by the FCs 182, 184. Each LM 186, 188 preferably operates as a message processor for memory access by the FCs, and preferably executes operations defined by received messages in accordance with a defined protocol.

The LMs 186, 188 respectively communicate with and control a number of memory modules including an exchange memory block 190, 192 a cache tables block 194, 196 buffer memory block 198, 200 and SRAM 202, 204. The FCs 182, 184 and the LMs 186, 188 respectively communicate via a cross-point switch (CPS) module 206, 208. In this way, a selected FC 182, 184 can establish a communication pathway through the CPS 206, 208 to a corresponding LM 186, 188 to communicate a status, access a memory module, or invoke a desired ISP operation.

Similarly, a selected LM 186, 188 can communicate responses back to the FCs 182, 184 via the CPS 206, 208. Although not shown, separate data bus connections are provided between each of the FCs 182, 184 and the CPS 206, 208, and between each of the LMs 186, 188 and the CPS 206, 208, to accommodate simultaneous data transfers therebetween. As will be appreciated, other configurations can readily be utilized as desired.

The controller architecture of FIGS. 6 and 7 advantageously provides scalable, highly functional data management and control for the array. Preferably, stripe buffer lists (SBLs) and other metadata structures are aligned to stripe boundaries on the storage media and reference data buffers in cache that are dedicated to storing the data associated with a disk stripe during a storage transaction.

To further enhance processing efficiency, the controller architecture preferably employs a novel writeback data caching methodology. This generally involves the caching of data to be written to storage devices and scheduling the transfer of such writeback data to the storage devices (flushing) at a later time.

During operation, the cache memory will store user data and other information associated with I/O transfers between the SAN 110 and storage devices. Readback data retrieved from the storage devices, including speculative data, may be retained for a time in the cache memory in hopes of a subsequent "cache hit," so that the subsequently requested data are forwarded directly from the cache instead of requiring the scheduling of an access operation with the storage devices.

Similarly, a writeback cache policy can be employed so that data to be written to the storage devices 128 is cached, a write complete command is sent back through the initiating HBA 103, and the actual writing of the data to the appropriate storage devices 128 is scheduled at a later time.

It is thus generally desirable for the controller 112 to maintain accurate control of the contents of the cache, including tracking the status of each entry. Such control is preferably carried out by way of a skip list arrangement which utilizes an address related table structure in accordance with preferred embodiments of the present invention. The skip list is preferably maintained in a portion of the cache memory, although other memory spaces can be utilized as desired.

The cache is managed on a node basis by the controller 112 using a data structure referred to as a stripe data descriptor (SDD). Each SDD holds data concerning recent and current accesses to the data with which it is associated. Each SDD preferably aligns to a corresponding RAID strip (i.e., all of the data on a selected storage device associated with a particular parity set), and conforms to a particular stripe buffer list (SBL).

Each cache node managed by the controller 112 preferably references some particular SDD, with active SDD structures for a given set of logical discs being preferably linked in ascending order via a virtual block address (VBA) using forward and backward linked lists.

Preferably, the VBA values are aligned with the RAID data organization using a grid system sometimes referred to as a RAID Allocation Grid System (RAGS). Generally, any particular collection of blocks belonging to the same RAID stripe (e.g., all of the data contributing to a particular parity set) will be assigned to a particular reliable storage unit (RSU) on a particular sheet. A book consists of a number of sheets and is constructed from multiple contiguous sets of blocks from different storage devices. Based on the actual sheet and VBA, the books can be further sub-divided into zones, indicating the particular device or device set (when redundancy is employed).

Each SDD preferably includes variables that indicate various states of the data, including access history, locked status, last offset, last block, timestamp data (time of day, TOD), identifiers to which zone (book) the data belong, and RAID level employed. Preferably, writeback ("dirty") data status of the data associated with the SDD is managed in relation to dirty data, dirty buffer, dirty LRU and flushing LRU values.

Preferably, the controller 112 concurrently operates to manage the writeback data processes at a number of different levels, depending on system requirements. A first level generally involves the periodic flushing of full SDD structures when a full RAID stripe is detected. This can be readily carried out for a given SDD based on the RAID level variable when the SDD identifies the associated data as dirty. Preferably, this involves a backward inspection to determine if enough consecutive adjacent SDD structures are sufficiently full of dirty data. If so, these SDD structures are placed in the seek queue and a request is made to commence flushing of the data.

Flushing smaller sets of data are also preferably handled on an SDD basis. Any SDD with dirty blocks and no locked blocks are preferably set as dirty LRU and sorted by age (e.g., time the data has spent in the cache waiting flushing). Once a particular aging is reached, the flushing LRU variable is preferably set and the seek queue is updated.

Figure 8:
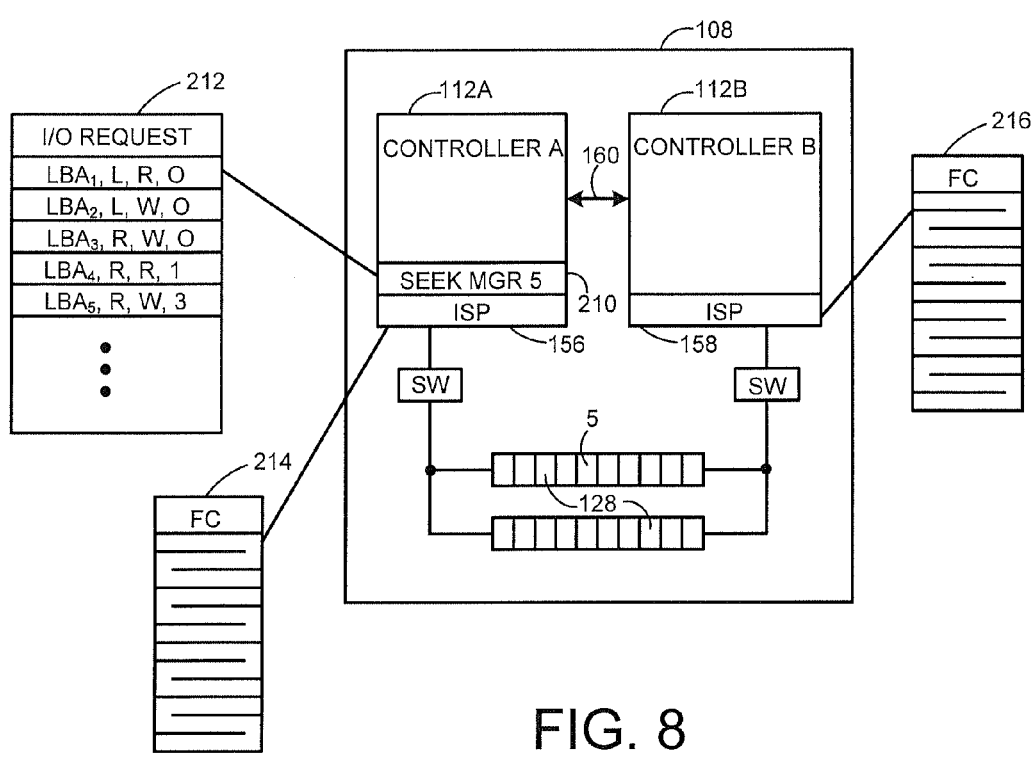
FIG. 8 is a diagrammatic depiction of the intelligent storage element.

FIG. 8 diagrammatically depicts the ISE 108 with the dual active-active controllers 112A, 112B. Controller 112A has top level control of a first memory space via ISP 156 and controller 112B has top level control of a second memory space different than the first memory space via ISP 158. Both controllers 112A, 112B can access any of the dual ported storage devices 128. A seek manager 210 denoted "Seek Manager 5" resides in controller 112A and is dedicated to deriving seek profiles for both controllers 112 with regard to the fifth storage device 128, denoted "5." Although not depicted, the storage managers for the other storage devices 128 can all reside in controller 112A too, or alternatively the storage managers can be distributed between the two controllers 112.

The seek manager 210 receives all data transfer requests for writeback data commands and host read commands from local controller 112A (the controller in which it resides) and puts them to a command queue 212. The seek manager 210 also receives all such data transfer requests from the remote controller 112B via the ebus 160, and likewise combines them with the local transfer requests in the command queue 212. Importantly, each of the controllers 112 puts transfer requests to the command queue 212 independently of the other controller 112. The transfer requests pending in the command queue 212 are indexable by the seek manager 210 according to any of a number of useful criteria, such as but not limited to that shown in FIG. 8 as the LBA, whether the request is remote or local (R or L), whether the request is for a read command or write command (R or W), and LUN class priority (0, 1, or 3).

The seek manager 210 commits local resources to issue a local transfer request from the command queue 212 by assigning the local transfer request to a slot in an FC 214 in the ISP 156 of controller 112A. Contrarily, the seek manager 210 commits remote resources to issue a remote transfer request from the command queue 212 by assigning the remote transfer request to a slot in an FC 216 in the ISP 158 of controller 112B.

Managing all data transfer requests with the common seek manager 210 eliminates the conflicting command profiles that otherwise occur where each controller 112 manages its own command queue independently of the other controller. That is, controller 112A is likely to derive a seek profile to storage device 5 that competes with a seek profile derived by controller 112B if it has no knowledge of the other controller's seek profile. For example, if controller 112A is invoking a zone-based seek scheduling technique focusing on an outer book of storage capacity including storage device 5, while controller 112B is doing the same but for an inner book, then the competition between the two seek profiles can create conditions where the actuator in storage device 5 cycles back and forth between the two books, defeating the purpose of short stroking the actuator within a book.

As discussed more below, the seek manager 210 can be subject to rules to optimize the throughput performance of data transfer requests, especially during times of burst access command activity from the network load. Managing both command queues with a common seek manager avails the system of the opportunity to extend the types of logical groupings that enhance flushing performance, such as limiting the command profile to a designated preferred zone of storage space for both command profiles simultaneously. Thus, the present embodiments not only eliminates the occurrences of conflicting command profiles, but can also advantageously increase the efficiency with which both command profiles cooperatively contribute a larger pool of desired seeks, such as in a designated book of storage capacity, from the two command profiles.

In another example, seek performance improvements can be achieved by taking advantage of the fact that some data transfer requests identify both primary transfer parameters and alternative transfer parameters. Say, for example, that the seek manager 210 currently has storage device 5 committed to a high rate of local writeback commands at an outermost zone at a time when the cache is saturated. A remote data transfer request for writeback commands to an innermost zone of storage device 5 is conflicting, and thus will not be issued to avoid diminishing the performance with which the local writeback commands are being satisfied. However, if the remote transfer requests identify an alternative transfer parameter, such as to another storage device, then the seek manager 210 can take advantage of immediately satisfying the remote requests at the alternative storage location.

Preferably, the aggressiveness of the flushing of data from the command queue 212 can be tied to the host load conditions. That is, not flushing aggressively enough during a relatively high host load can cause the cache to reach saturation. Conversely, flushing too aggressively during a relatively low host load can negatively impact the latency of host read requests. Both scenarios adversely affect ISE 108 system performance.

Figure 9:
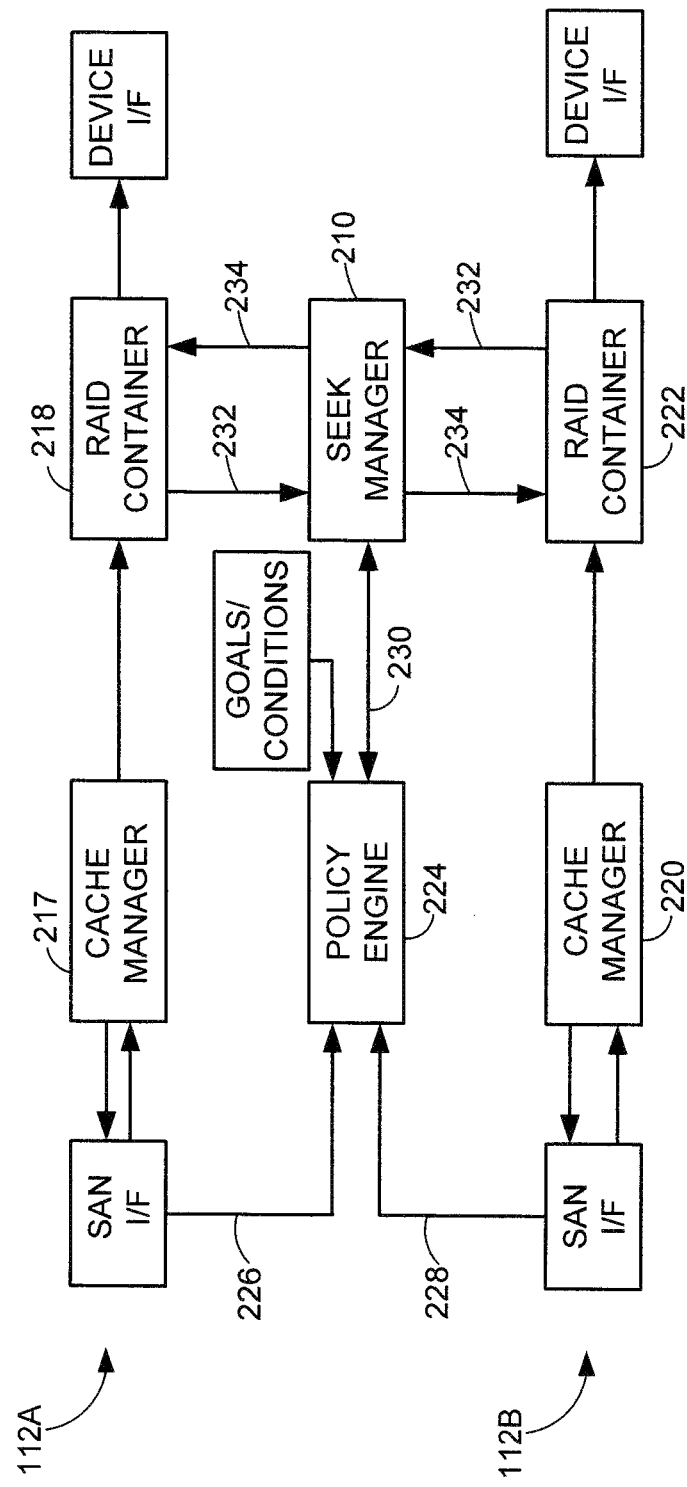
FIG. 9 is a functional block diagram of the intelligent storage element.

FIG. 9 is a functional block diagram depicting a cache manager 217 and a RAID container services module 218 that reside in the local controller 112A (FIG. 8). Similarly, a cache manager 220 and a RAID container services module 222 reside in the remote controller 112B. A policy engine 224 resides in the same controller that has the locus of control over the seek manager 210. These functional blocks can exist in software or hardware, in the latter such as but not limited to the policy engine 224 being a finite state machine.

In any event, the policy engine 224 continuously collects qualitative data about access commands received via the respective fabric I/Fs on an I/O-by-I/O basis via paths 226, 228, respectively. The policy engine 224 dynamically characterizes the host load and consequently issues rules via path 230 that govern the seek manager 210 which, in turn, queries the command queue 212 (FIG. 8) of data transfer requests derived from requests to flush writeback data and host read commands via path 232 and selectively grants permissions to issue data transfer requests via path 234 to define each of the two command profiles. It is noted that issued remote data transfer requests are transferred to the controller 112B via the ebus 160 (FIG. 8) that is not depicted in FIG. 9.

The policy engine 224 can collect quantitative data about the load in real time, such as the current rate of access commands initiated by one or more network devices. The policy engine 224 also preferably collects qualitative data about the network load in order to dynamically characterize the load and continuously adjust the command profile to the array in relation to the characterization. For example, the policy engine 224 preferably collects real time continuous data characterizing the host load in terms of the ratio of rate sensitive commands to latency sensitive commands.

For purposes of the present description a writeback caching scheme is presumed. For purposes of this description writeback cache commands are considered to be rate sensitive commands because it does not matter so much which requests are flushed to the data storage devices 128 at any point in time. In fact, rate sensitive requests may even be overwritten while pending in cache as dirty data. What matters is that rate sensitive commands get flushed at a rate that prevents the cache from reaching saturation.

On the other hand, a host access command to read data that is stored in one or more of the data storage devices 128 will likely cause the host application to block further processing until the access command is satisfied. The time it takes to satisfy the access command, the latency period, is critical to the performance of the application. Such commands are thereby referred to as the latency sensitive commands. In certain circumstances the host can opt to not authorize writeback caching. In that case a write command, called a write through cache command, is likewise categorized as a latency sensitive command.

The policy engine 224 can thereby continuously collect qualitative information about a network load to the local controller 112A, and to the remote controller 112B, dynamically characterize the loads, and continuously correlate the seek profiles by both controllers 112 to the array in relation to the characterization. For example, without limitation, under relatively high load conditions with the cache approaching or in saturation the policy engine 224 can advantageously match the seek profile to the network load with respect to the ratio of rate sensitive access commands to latency sensitive access commands.

The policy engine 224 can also collect qualitative data characterizing the host load in other terms such as but not limited to the size of the associated data file (bandwidth), the HBA 103 and/or network device from which the access command initiated, storage device 128 access history or any part thereof such as in terms of book access history, timestamp data, RAID class, and the LUN class to which the access command is directed.

In collecting qualitative data the policy engine 224 preferably tallies counts during each of a predetermined sample interval, such as but not limited to each one-second interval. A free running counter can be set with a pointer moving the index on one-second boundaries to continuously track the ratio. The counter holds a desired number of previously observed ratios, such as the previous 8 one-second sample ratios, with a ninth slot for tallying the current one-second ratio. On the one second boundaries the index cycles, subtracts the indexed historical value and adds the latest sample value, then divides by 8 to calculate the most recent running average of the ratio.

The policy engine 224 can be responsive to performance goals and/or system conditions 196 in formulating rules for the seek manager 210. The performance goals can be quantitative or qualitative, such as but not limited to enforcing a desired command profile that is some factor of the network load in terms of the ratio of latency sensitive commands to rate sensitive commands (ratio of read to write commands for writeback caching), enforcing assigned priorities to different LUN classes, enforcing a desired read command latency, and the like.

Additionally, the system conditions can be such as a power supply indicator that informs the policy manager 224 that the ISE 108 has switched to a battery backup power source. In this condition the policy manager 224 will likely implement contingencies to aggressively flush the caches with respect to the projected limited power availability. The policy engine 224 is also responsive to the state of pending background I/Os, or I/Os not directly involved with access command data transfers, in formulating the rules governing the seek manager 210 in the manner that it derives the seek profiles for both controllers 112.

Generally, the present embodiments contemplate a storage system having a dual active-active storage array configured for connecting to a network to transfer data in response to network access commands, and means for deriving seek profiles to each storage device in the array by eliminating conflicting data transfer requests from a first controller having top level control of a first memory space and from a second controller having top level control of a second memory space. For purposes of this description and meaning of the appended claims the phrase "means for deriving" expressly includes the structure disclosed herein and equivalents thereof that permit a common seek manager to derive seek profiles for both sides of the active-active array controller. For purposes of this description and meaning of the appended claims "means for deriving" does not contemplate related attempted solutions wherein each side of the array controller derives a seek profile independently of the other side.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed:

1. A dual active-active array storage system comprising:
   a first controller with top level control of a first memory space;
   a second controller with top level control of a second memory space different than the first memory space;
   a seek manager residing in only one of the controllers defining an individual command profile for each of the first and second controllers derived from a combined list of data transfer requests from both controllers; and
   a policy engine that continuously collects qualitative information about a network load to both controllers to dynamically characterize the load, and that governs the seek manager to continuously correlate each command profile in relation to the load characterization.

2. The system of claim 1 wherein each of the controllers issues data transfer requests independently of the other controller.

3. The system of claim 1 wherein the combined list comprises local data transfer requests from the first controller in which the seek manager resides and remote data transfer requests from the second controller, and wherein the seek manager commits local resources of the first controller to issue a local data transfer request and commits remote resources of the second controller to issues a remote data transfer request.

4. The system of claim 1 wherein at least one of the data transfer requests identifies primary transfer parameters and alternative transfer parameters, and the seek manager issues commands corresponding to either the primary and alternative transfer parameters in one or more command profiles.

5. The system of claim 1 wherein the policy engine is responsive to the load characterization and at least one of performance goals, system condition, and background I/Os in defining rules governing the seek manager.

6. The system of claim 1 wherein the policy engine characterizes the load in terms of a bandwidth associated with each access command.

7. The system of claim 1 wherein the policy engine enforces logical unit number (LUN) priorities assigned to the access commands.

8. The system of claim 1 wherein the policy engine enforces a maximum permitted latency of the access commands.

9. The system of claim 1 wherein the array contains a plurality of discrete data storage devices, and comprising a dedicated seek manager for each data storage device individually responsive to the rules from the policy engine.

10. The data storage system of claim 1 wherein the policy engine comprises a finite state machine.

11. The system of claim 1 wherein the policy engine characterizes the load in terms of a ratio of rate sensitive access commands to latency sensitive access commands.

12. The system of claim 11 wherein the rate sensitive commands are characterized as writeback cache commands and the latency sensitive commands are at least one of read commands and writethrough cache commands.

13. The system of claim 11 wherein the policy engine selectively matches at least one of the command profiles to the load with respect to the ratio of rate sensitive access commands to latency sensitive access commands.

14. A method comprising:
   receiving network access commands by a dual active-active array storage system to a first controller having top level control of a first memory space and to a second controller having top level control of a second memory space;
   collecting qualitative information about the access commands;
   dynamically characterizing the access command load to the controllers;
   sending data transfer requests associated with the access commands from both controllers independently of the other controller to a combined list;
   issuing an individual command profile to each of the first and second controllers from the combined list with only one seek manager that is responsive to the dynamically characterizing step.

15. The method of claim 14 wherein the issuing step comprises the seek manager committing local resources with respect to data transfer requests from the controller in which the seek manager resides, and committing remote resources with respect to data transfer requests from the controller in which the seek manager does not reside.

16. The method of claim 14 wherein the issuing step comprises issuing two seek commands to the command profile in response to a data transfer request identifying primary transfer parameters and alternative transfer parameters.

17. The method of claim 14 wherein the issuing step comprises selectively matching the command profiles to the load characterization in relation to a ratio of rate sensitive commands to latency sensitive commands.

18. A dual active-active array storage system comprising:
   a first controller with top level control of a first memory space;

a second controller with top level control of a second memory space different than the first memory space;

a storage manager residing in only one of the controllers defining an individual command profile for each of the first and second controllers derived from a combined list of data transfer requests from both controllers; and a policy engine that continuously collects qualitative information about a network load to both controllers to dynamically characterize the load in terms of a ratio of writeback cache commands to at least one of read commands and writethrough cache commands, and that governs the storage manager to continuously correlate each command profile in relation to the load characterization.

* * * * *